US008671460B1

(12) United States Patent
Havekost et al.

(10) Patent No.: US 8,671,460 B1
(45) Date of Patent: Mar. 11, 2014

(54) OPERATOR LOCK-OUT IN BATCH PROCESS CONTROL SYSTEMS

(75) Inventors: Robert B. Havekost, Austin, TX (US); David L. Deitz, Austin, TX (US); Dennis L. Stevenson, Round Rock, TX (US); William G. Irwin, Austin, TX (US); Michael G. Ott, Austin, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 2503 days.

(21) Appl. No.: 09/669,297

(22) Filed: Sep. 25, 2000

(51) Int. Cl.
*G06F 7/00* (2006.01)

(52) U.S. Cl.
USPC ................................. 726/30; 726/2

(58) Field of Classification Search
USPC ........................................ 700/90–95
See application file for complete search history.

(56) References Cited

U.S. PATENT DOCUMENTS

| 3,116,753 | A | * | 1/1964 | Howe | 137/487.5 |
|---|---|---|---|---|---|
| 3,377,623 | A | * | 4/1968 | Richard et al. | 710/316 |
| 4,143,415 | A | * | 3/1979 | Klingbeil | 700/8 |
| 4,215,407 | A | * | 7/1980 | Gomola et al. | 700/95 |
| 4,227,245 | A | * | 10/1980 | Edblad et al. | 700/95 |
| 4,270,168 | A | * | 5/1981 | Murphy et al. | 714/10 |
| 4,827,423 | A | * | 5/1989 | Beasley et al. | 700/96 |
| 4,886,590 | A | * | 12/1989 | Tittle | 204/232 |
| 5,006,992 | A | * | 4/1991 | Skeirik | 706/58 |
| 5,166,678 | A | * | 11/1992 | Warrior | 340/870.15 |
| 5,263,155 | A | * | 11/1993 | Wang | 707/8 |
| 5,446,903 | A | | 8/1995 | Abraham et al. | |
| 5,450,346 | A | * | 9/1995 | Krummen et al. | 700/11 |
| 5,539,906 | A | * | 7/1996 | Abraham et al. | 707/9 |
| 5,784,577 | A | * | 7/1998 | Jacobson et al. | 710/104 |
| 6,425,060 | B1 | * | 7/2002 | Mounes-Toussi et al. | 711/158 |
| 6,467,032 | B1 | * | 10/2002 | Lippert | 711/150 |
| 6,496,880 | B1 | * | 12/2002 | Ma et al. | 710/38 |
| 6,662,253 | B1 | * | 12/2003 | Gary et al. | 710/244 |
| 6,915,367 | B2 | * | 7/2005 | Gary et al. | 710/244 |
| 2003/0145144 | A1 | * | 7/2003 | Hofmann et al. | 710/110 |
| 2003/0154336 | A1 | * | 8/2003 | Ballantyne et al. | 710/110 |

FOREIGN PATENT DOCUMENTS

| DE | 41 39 179 | 6/1993 |
|---|---|---|
| DE | 296 04 605 | 7/1996 |
| JP | 01-217501 A | 8/1989 |
| JP | 09-319406 A | 12/1997 |
| JP | 2000-047923 A | 2/2000 |

OTHER PUBLICATIONS

"Configuring the SR90 Controller," A. Pederson, May 1999.
Examination Report under Section 18(3) issued in GB 0122847.7 application by the United Kingdom Patent Office on Jun. 24, 2004.

(Continued)

*Primary Examiner* — Tamara T Kyle
(74) *Attorney, Agent, or Firm* — Marshall, Gerstein & Borun LLP

(57) ABSTRACT

A process control system includes module-level attributes that may be used to control access for writing information to unit module objects and module objects. A security check process examines the module-level attributes, which may include OPERMODE and OPERLOCK attributes, the values of which determine whether information may be written to unit module objects or module objects. The values of the module-level attributes may be controlled based on whether a particular module object is being used by the process control system.

36 Claims, 7 Drawing Sheets

(56) References Cited

OTHER PUBLICATIONS

Search Report under Section 17 issued by the United Kingdom Patent Office on Apr. 25, 2002.
Patnaik, "What is S95?—for the Pharmaceutical Industry," pp. 1-15 (2000).
Office Action for Japanese Patent Application No. 2001-291552 mailed on May 24, 2011.
Office Action for Japanese Patent Application No. 2001-291552 mailed on Apr. 24, 2012.
Office Action for German Patent Application No. 101 47 050.9 mailed on Oct. 26, 2012.
"Unix File Permissions", from Wikipedia, http://de.wikipedia.org/w/inex.php?title=Unix-Dateirechte&oldid=109609803, dated Oct. 22, 2012 (machine translation).

* cited by examiner

OPERATOR LOCK-OUT IN BATCH PROCESS CONTROL SYSTEMS

FIELD OF THE INVENTION

The present invention relates generally to process control networks and, more specifically, to preventing operators from modifying module objects or equipment for use in a process, such as a batch process, during a run of the process.

DESCRIPTION OF THE RELATED ART

Process control networks, such as those used in chemical, petroleum or other processes, generally include a centralized process controller communicatively coupled to one or more field devices which may be, for example, valve positioners, switches, sensors (such as temperature, pressure and flow rate sensors), etc. These field devices may perform physical control functions within the process (such as opening or closing a valve), may take measurements within the process for use in controlling the operation of the process or may perform any other desired function within the process. Process controllers have historically been connected to field devices via one or more analog signal lines or buses which may carry, for example, 4-20 milliampere (mA) signals to and from the field devices. More recently, however, the process control industry has developed a number of standard, open, digital or combined digital and analog communication protocols such as the FOUNDATION™ FIELDBUS (hereinafter "Fieldbus"), HART®, PROFIBUS®, WORLDFIP®, Device-Net® and CAN protocols which can be used to implement communications between a controller and field devices. Generally speaking, the process controller receives signals indicative of measurements made by one or more field devices and/or other information pertaining to the field devices, uses this information to implement a typically complex control routine and generates control signals which are sent via the signal lines or buses to the field devices to thereby control the operation of the process.

Certain types of process control networks, such as those used in batch processes, typically include multiple sets of replicated equipment designed to have the same or similar equipment that performs essentially the same function within the processes. Thus, for example, a cookie manufacturing plant may have multiple sets of mixing equipment (i.e., mixing units), multiple sets of baking equipment (i.e., baking units), and multiple sets of packaging equipment (i.e., packaging units), with some or all of the mixing units, being capable of operating in parallel and of being connected to operate in series with some or all of the baking units and the packaging units.

Typically, a batch process performs a number of different phases or steps in sequence, finishing the first stage before beginning the second stage. Thus, in the cookie manufacturing plant described above, the batch process may run a first phase or step to control the mixing unit, may then run a second phase to run the baking unit on the product made by the mixing equipment and may then run a third phase that controls the packaging unit to package the product produced by the baking unit. Typically, each unit has an associated unit module object, which may be software adapted to represent the state of a unit (e.g., a hardware component). Unit module objects may be algorithms embodied in software instructions that are optimized to coordinate the execution of lower-level modules (hereinafter the lower-level modules will be referred to simply as "module objects"). Module objects, as described in further detail hereinafter, may include a variable portion and an algorithm portion. Typically, a module object is designed to carry out a single logical function such as, for example, opening a valve or filling a tank. In short, module objects are used to change the state of a hardware component.

Although the foregoing exemplary batch process for making cookies indicates that each phase operates on one particular unit, this is not necessarily always the case. Depending on the number of steps of each phase, multiple units of equipment may be used to carry out a particular phase. For example, if instead of a batch process being written and used for cookie making, cookie making may be a single phase of a larger batch process, such a phase could control mixing, baking and packaging units.

Each unit (and its associated unit module object) may have one or more module objects associated therewith. Typically, when a unit module object has subordinate module objects, the unit module object may be said to "own" the subordinate module objects. For example, a mixing unit module object may own a number of valves for dispensing ingredients into a mixer, each one of the number of valves may have an associated module object for controlling the position of a particular valve. A module object may include input, processing and output portions. In operation the input portion may receive a signal from a sensor and pass the received signal to the processing portion for processing. The processing portion may compare the received signal to a set point and generate an output based on the difference between the two signals. The output signal from the processing portion is passed to the output portion, which produces an output used to control a piece of hardware (e.g., a valve). For example, during a mixing phase, a valve module object may receive and indication of the volume of milk in the mixer. The processing portion of the module object may compare the milk volume indication to a set point representative of the desired volume of milk in the mixer using a proportional-integral-differential (PID) control routine to determine if additional milk needs to be added to the mixer. Based on the results of the comparison between the milk volume indication and the set point, the module object may control a valve to increase, decrease or stop the flow of milk into the mixer.

In the foregoing example, an additional module object associated with an output valve may be used to control the flow of cookie dough from the mixer by opening a valve during a mixing phase. Individual module objects may be used by different phases in a batch process. Additionally, an operator may desire to change the programming of a particular module object. For example, an operator may change a set point of a module object while cleaning the mixing unit. While changing the programming of a module object may allow an operator to perform necessary functions such as cleaning, maintenance, repair and the like, changing the programming of a module object during the execution of a batch process or phase using that module object may disrupt the operation of that batch process or phase.

Accordingly, operators must be very careful to ensure that a particular module object is not currently in use or scheduled to be used before changing the programming of that module object. For example, an operator may desire to change parameters such as set points, flow rates, timing or other parameters of a particular module object. However, no matter how careful an operator may be, inadvertent reprogramming of module object may occur and may disrupt the execution of a batch process or phase, thereby potentially causing loss or contamination of product (e.g., cookie dough).

In applications other than manufacturing, inadvertent reprogramming of a module object may have more serious consequences. For example, in a module object used in a batch process or phase used to control a nuclear power plant, inadvertent reprogramming may cause a catastrophic accident.

SUMMARY OF THE INVENTION

A process control system includes module level parameters contained in unit module objects and module objects. Such parameters may be used to control module object access to prevent inadvertent module object reprogramming. Module object access may be controlled individually on a module-by-module basis or may be hierarchically controlled based on the module objects owned by a unit module object or used by a phase. In particular, module object access may be locked, unlocked or restricted. When a module object is locked, parameters or programming of that module object may not be changed (e.g., information may not be written to that module object). Conversely, when a module object is unlocked, parameters or programming of that module object may be changed (e.g., information may be written to that module object). Restricted access is a combination of both locked and unlocked states, wherein the module object is unlocked for an operator having a proper access code, but is locked for an operator not having the proper access code. The module object level parameters may prevent operators from inadvertently modifying a module object that is or will be used by a batch process or phase, thereby preventing the batch process or phase from inadvertently being disrupted.

According to a first embodiment, the present invention may be a method of controlling access for writing information to a module object for use in a process control system having a unit module object representative of a state of a hardware component, wherein the module object is associated with the unit module object and used to change the state of the hardware component, wherein the unit module object has a unit module object mode attribute having a value. The method may include the steps of determining the value of the unit module object mode attribute and selectively allowing access for writing information to the module object based on the value of the unit module object mode attribute.

In some embodiments, the step of selectively allowing access for writing information to the module object may include a step of allowing access for writing information to the module object when the value of the unit module object mode attribute is in an unlocked state. Additionally, the step of selectively allowing access for writing information to the module object may include a step of not allowing access for writing information to the module object when the value of the unit module object mode attribute is in a locked state. Further, the step of selectively allowing access for writing information to the module object may include a step of determining whether a user has authorization to write information to the module object.

In other embodiments, the module object may include a module object mode attribute having a value and wherein the step of selectively allowing access for writing information to the module object may include a step of controlling access for writing information to the module object based on the value of the unit module object mode attribute and based on the value of the module object mode attribute.

In other embodiments, the unit module object may include a unit module object lock attribute having a value and wherein the step of selectively allowing access for writing information to the module object may include a step of controlling access for writing information to the module object based on the value of the unit module object lock attribute. Additionally, the process control system may include a phase and the step of selectively allowing access for writing information to the module object may include a step of determining the value of the unit module object lock attribute by determining if the unit module object is being used by the phase.

Additionally, the process control system may include a phase including an operator lockout and wherein the step of selectively allowing access for writing information to the module object may include a step of determining the value of the unit module object lock attribute by determining if the operator lockout has been set for the phase using the unit module object. Further, the unit module object may include a unit module object lock attribute having a value and the process control system may include a plurality of module objects that are associated with the unit module object, and wherein the step of selectively allowing access for writing information to the module object includes a step of controlling access for writing information to the plurality of module objects based on the value of the unit module object lock attribute.

According to a second embodiment, the invention may be an access control system for controlling access for writing information to a module object for use in a process control system having a processor and a unit module object representative of a state of a hardware component, wherein the module object is associated with the unit module object and used to change the state of the hardware component, wherein the unit module object has a unit module object mode attribute having a value. The access control system may include a memory, a first routine stored on the memory for causing the processor to determine the value of the unit module mode attribute and a second routine stored on the memory for causing the processor to selectively allow access for writing information to the module object based on the value of the unit module object mode attribute.

According to a third embodiment, the invention may be a method of controlling access for writing information to a module object for use in a process control system having a unit module object representative of a state of a hardware component, wherein the module object is associated with the unit module object and used to change the state of the hardware component, wherein the module object has a module object mode attribute having a value. In such an embodiment, the method may include the steps of determining the value of the module object mode attribute and selectively allowing access for writing information to the module object based on the value of the module object mode attribute.

According to a fourth embodiment, the present invention may be a process control system including process control equipment and a module object associated with the process control equipment, wherein the module object includes a parameter used to control the operation of the process control equipment and wherein the module object includes a module object mode attribute for selectively allowing access for writing information to the parameter of the module object.

The invention itself, together with further objects and attendant advantages, will be best understood by one having ordinary skill in the art by reference to the following detailed description, taken in conjunction with the accompanying drawings.

DESCRIPTION OF THE PREFERRED EMBODIMENTS

Figure 1:
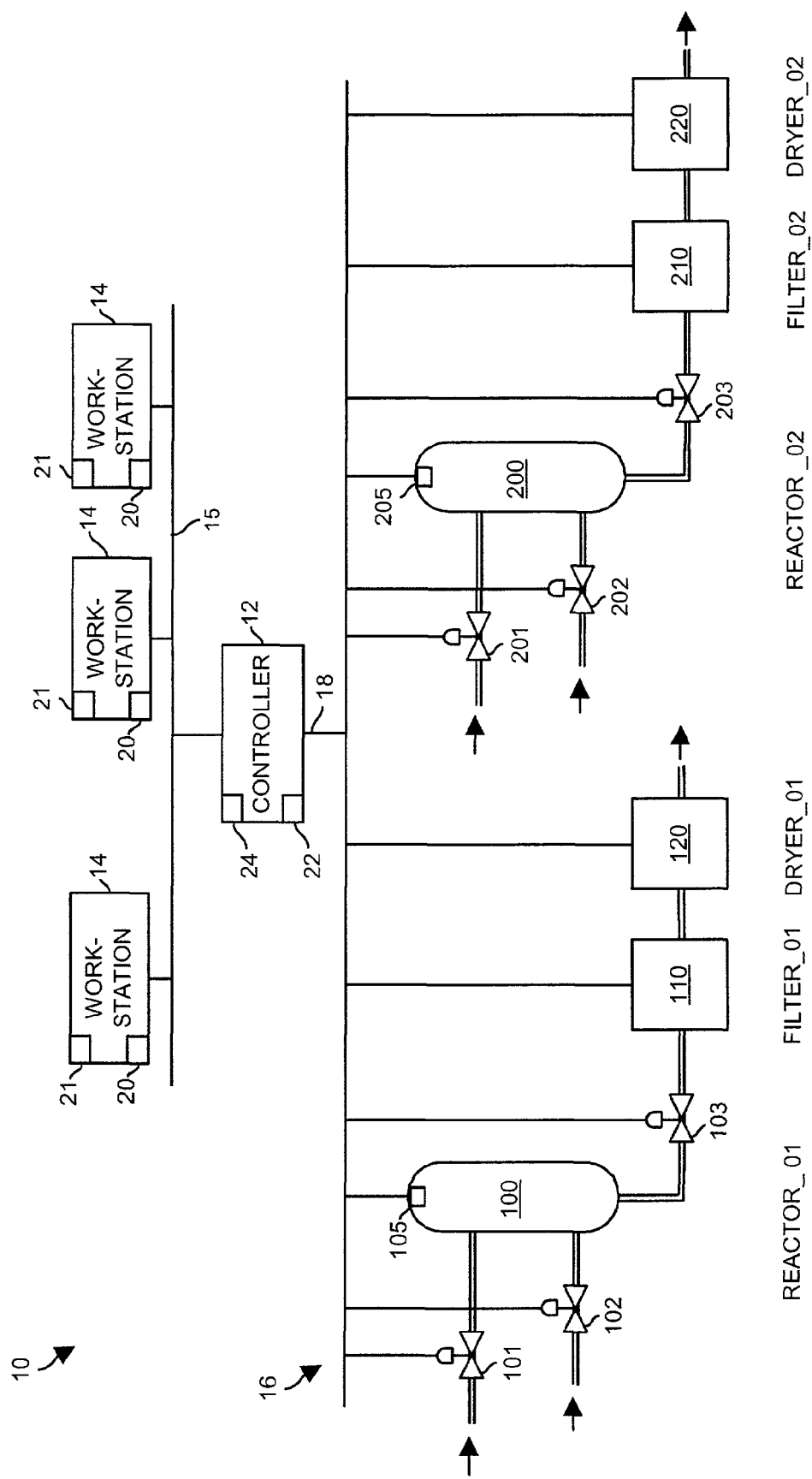
FIG. 1 is a partial block diagram, partial schematic diagram of a portion of a process control network that may use module level parameters to control module access.

Referring now to FIG. 1, a process control network 10 includes a process controller 12 coupled to numerous workstations 14 via, for example, an Ethernet connection 15. The controller 12 is also coupled to devices or equipment within a process (generally designated by the reference numeral 16) via an input/output (I/O) device (not shown) and a set of communication lines or a bus 18. The controller 12, which may be by way of example only, the DeltaV™ controller sold by Fisher-Rosemont Systems, Inc., is capable of communicating with control elements, such as field devices and function blocks within field devices distributed throughout the process 16 to perform one or more process control routines to thereby implement desired control of the process 16. These process control routines may be continuous or batch process control routines or procedures. The workstations 14 (which may be, for example, personal computers) may be used by one or more engineers or operators to design process control routines to be executed by the controller 12, to communicate with the controller 12 so as to download such process control routines, to receive and display information pertaining to the process 16 during operation of the process 16 and to otherwise interact with the process control routines executed by the controller 12. Each of the workstations 14 includes a memory 20 for storing applications, such as configuration design applications, and for storing data, such as configuration data pertaining to the configuration of the process 16. Each of the workstations 14 also includes a processor 21 that executes the applications to enable a user to design process control routines and to download these process control routines to the controller 12. Likewise, the controller 12 includes a memory 22 for storing configuration data and process control routines to be used to control the process 16 and includes a processor 24 that executes the process control routines to implement a process control strategy. If the controller 12 is a DeltaV controller, it may provide a graphical depiction of the process control routines within the controller 12 to a user via one of the workstations 14 illustrating the control elements within the process control routine and the manner in which these control elements are configured to provide control of the process 16.

In the example process control network 10 illustrated in FIG. 1, the controller 12 is communicatively connected via the bus 18 to two sets of similarly configured equipment, each set having a reactor unit referred to herein as Reactor_01 (R1) or Reactor_02 (R2), a filter unit referred to herein as Filter_01 (F1) or Filter_02 (F2) and a dryer unit referred to herein as Dryer_01 (D1) or Dryer_02 (D2). Reactor_01 includes a reactor vessel 100, two input valves 101 and 102 connected so as to control fluid inlet lines providing fluid from, for example, a headtank (not shown) into the reactor vessel 100 and an output valve 103 connected so as to control fluid flow out of the reactor vessel 100 via an outlet fluid line. A device 105, which may be a sensor, such as a temperature sensor, a pressure sensor, a fluid level meter, etc. or some other equipment such as an electrical heater or a steam heater, is disposed in or near the reactor vessel 100. The Reactor_01 is coupled, via the valve 103, to the Filter_01 having filter equipment 110 which, in turn, is coupled to the Dryer_01 having dryer equipment 120. Similarly, the second set of equipment includes the Reactor_02 that has a reactor vessel 200, two input valves 201 and 202, an output valve 203 and a device 205. The Reactor_02 is coupled to the Filter_02 having filter equipment 210 which, in turn, is coupled to the Dryer_02 which has dryer equipment 220. The filter equipment 110 and 210 and the dryer equipment 120 and 220 may have additional control elements (such as heaters, conveyor belts and the like), sensors, etc. associated therewith.

As illustrated in FIG. 1, the controller 12 is communicatively coupled to the valves 101-103, 201-203, to the devices 105, 205, to the filters 110, 210 and to the dryers 120 and 220 (and to the other equipment associated therewith) via the bus 18 to control the operation of these elements to perform one or more operations with respect to these units. Such operations may include, for example, filling the reactor vessels, or dryers, heating the material within the reactor vessels or dryers, dumping the reactor vessels or dryers, cleaning the reactor vessels or dryers, operating the filters, etc.

The valves, sensors and other equipment illustrated in FIG. 1 may be any desired kind or type of equipment including, for example, Fieldbus devices, standard 4-20 mA devices, HART devices, etc. and may communicate with the controller 12 using any known or desired communication protocol such as the Fieldbus protocol, the HART protocol, the 4-20 mA analog protocol, etc. Still further, other types of devices may be connected to and be controlled by the controller 12. Also, other controllers may be connected to the controller 12 and to the workstations 14 via the Ethernet communication line 15 to control other devices or areas associated with the process 16 and the operation of such additional controllers may be coordinated with the operation of the controller 12 illustrated in FIG. 1 in any desired manner.

Generally speaking, the process control system of FIG. 1 may be used to implement batch processes in which, for example, one of the workstations 14 or the controller 12 executes a batch executive routine or a batch procedure. The batch procedure (which is typically run in one of the workstations 14) is a high level control routine that directs the operation of one or more unit procedures, which are subroutines or processes that operate on a single unit, such as one of the reactor units, the filter units, the dryer units, or other equipment. Each unit procedure (which is also generally run on the workstation 14) may perform a series of operations, each of which may perform one or more phases on a unit having an associated unit module. For this discussion, a phase is the lowest level action or step performed on a unit and is typically implemented or executed in one of the controllers 12, an operation is a set of phases that performs a particular function on the unit and is typically implemented or executed on one of the workstations 14 by calling a series of phases, while a unit procedure is a series of one or more operations performed on a single unit and is typically implemented as a set of operation calls. As a result, any unit procedure can include one or more phases and/or one or more operations. In this manner, the batch executive routine performs different steps or stages (i.e., unit procedures) needed to produce a product, such as a food product, a drug, etc.

To implement different unit procedures, operations and phases, the batch procedure uses what is commonly referred to as a recipe that specifies the steps to be performed, the amounts and times associated with the steps and the order of the steps. Steps for one recipe might include, for example, filling a reactor vessel with the appropriate materials or ingredients, mixing the materials within the reactor vessel, heating the materials within the reactor vessel to a certain temperature for a certain amount of time, emptying the reactor vessel and then cleaning the reactor vessel to prepare for the next batch run, running a filter to filter the output of a reactor and then running a dryer to dry the product created in the reactor vessel. Each of the series of steps associated with a different unit defines a unit procedure of the batch run and the batch executive routine or batch procedure within the controller 12 will execute a different control algorithm for each one of these unit procedures. Of course, the specific materials, amounts of materials, heating temperatures and times, etc. may be different for different recipes and, consequently, these parameters may change from batch run to batch run depending on the product being manufactured or produced and the recipe being used. Those skilled in the art will understand that, while control routines and configurations are described herein for batch runs in the reactor units, the filter units and the dryer units illustrated in FIG. 1, control routines may be used to control other desired devices to perform any other desired batch process runs or to perform continuous process runs, if so desired.

As will also be understood by those having ordinary skill in the art, the same phases, operations or unit procedures of a batch process can be implemented on each of the different reactor units of FIG. 1 at the same or at different times. Furthermore, because the reactor units of FIG. 1 generally include the same number of and types of equipment (i.e., they belong to the same unit class), the same generic phase control routine for a particular phase may be used to control each of the different reactor units, except that this generic phase control routine has to be modified to control the different hardware or equipment associated with the different reactor units. For example, to implement a fill phase for Reactor_01 (wherein the reactor unit is filled), a fill control routine will open one or more of the input valves 101 or 102 for a certain amount of time, for example, until the fluid level meter 105 senses that the vessel 100 is full. However, this same control routine may be used to implement a fill phase for Reactor_02 by merely changing the designation of the input valve(s) to be the valves 201 or 202 instead of the valves 101 or 102 and by changing the designation of the fluid level meter to be the fluid level meter 205 instead of the fluid level meter 105.

Figure 2:
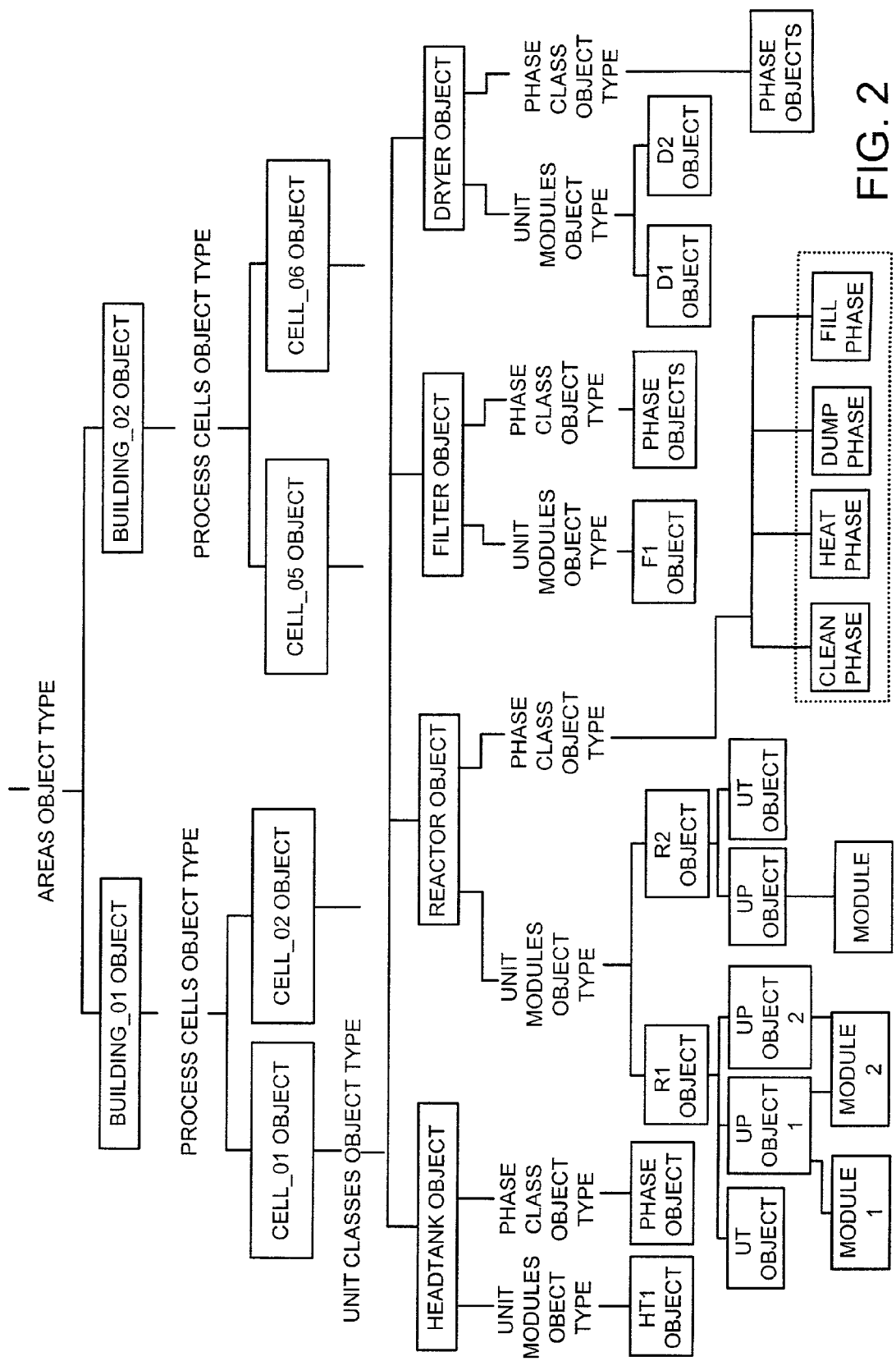
FIG. 2 is a block diagram of an object structure illustrating a conceptual configuration of the process control network of FIG. 1.

The object structure or tree of FIG. 2 illustrates specific objects within boxes while general categories of objects (or object types) are indicated above the objects in the tree with no box. As illustrated in FIG. 2, the process control network 10 includes one or more areas which may be, for example, buildings or other geographical area designations within a plant. In the object tree of FIG. 2, the process has two area objects named Building_01 and Building_02. Each area object may be divided into process cells, each of which identifies a different aspect of the process being performed in the area or a set of interconnected equipment in the area. The Building_01 area object of FIG. 2 is illustrated as including at least two process cell objects designated Cell_01 and Cell_02. Each cell object may include zero, one or more unit classes, which identify different categories or groupings of hardware used in the process cell.

A unit class is a named object that holds a common configuration of a set of replicated equipment and, more particularly, is a collection of units that have very similar, if not identical, process instrumentation, each of which performs a very similar, if not identical, function within a process. Unit class objects are typically named to describe the types of units within the process control system to which they belong. FIG. 2 illustrates a HeadTank unit class, a Reactor unit class, a Filter unit class and a Dryer unit class associated with the Cell_01 object. Similar unit classes would be found in Cell_02 while other groupings of units could be associated with other cells. Of course, in most process control networks, many other types of unit classes will be provided or defined as well.

As illustrated for the Reactor unit class of FIG. 2, each unit class object may have unit module objects and phase class objects (i.e., phases) associated therewith. Unit module objects generally specify certain instances of replicated hardware within the named unit class while phase classes generally specify the phases that can be applied to the unit module objects associated with the unit class. More particularly, a unit module object may be a named software object that holds all of the variables and unit phases for a single process unit and is typically named to identify specific process equipment. For example, the Reactor unit class of Cell_01 of FIG. 2 has the R1 and R2 phase objects, which correspond to the Reactor_01 and Reactor_02 unit modules illustrated in FIG. 1. The HeadTank unit class of Cell_01 includes the single unit module of HT1. Similarly, Filter unit class of Cell_01 has the specific filter module F1 while the Dryer unit class of Cell_01 has the dryer units of D1 and D2 associated therewith. Similarly, the Cell_02 will have unit classes of a HeadTank (having a single unit module of HT1), a Reactor (having a single reactor unit module of R3), a Filter (having filter unit modules F2 and F3).

As shown in FIG. 2, each unit phase object may have one or more associated module objects, each of which may include input, processing and output portions as well as a portion that may monitor a set point (which may or may not be included within the processing portion). For example, the unit phase object 1 (which may be considered to be a unit module object) may own module objects 1 and 2. Additionally, unit phase object 2 (which may also be considered to be a unit module object) may own module object 2. As will be appreciated by those having ordinary skill in the art, module objects may be associated with one or more different unit module objects or unit phase objects. Generally, although a particular module object is associated with two or more different unit module objects, only one of those unit module objects may use the particular module object at a given time. Any module object that is associated with a unit module object may be referred to as being owned by that unit module object.

Phase classes are named objects that hold the common configuration for a phase that can run on the multiple units belonging to the same unit class and, if desired, on multiple different unit classes. In essence, each phase class is a different control routine that is created and is used by the controller 12 to control unit modules within the same or different unit classes. Typically, each phase class is named in accordance with the verb that describes an action performed on a unit module. For example, as illustrated in FIG. 2, the Reactor unit class has a Fill phase class which is used to fill any one of the reactor vessels 100 or 200 of FIG. 1, a Heat phase class which is used to heat any one of the reactor vessels 100 or 200 of FIG. 1, a Dump phase class which is used to empty any one of the reactor vessels 100 or 200 of FIG. 1, and a Clean phase class which is used to clean any one of the reactor vessels 100 or 200 of FIG. 1. Of course there can be any other phase classes associated with this or any other unit class. While no specific phase classes are illustrated in FIG. 2 for the Head-Tank, Filter and Dryer unit classes, at least one phase class exists for each and is used by a batch procedure to implement a part of a batch process, unit procedure or operation using the unit module object with which the phase class is associated.

A phase class may generally be thought of as a subroutine to be called by an operation of a unit procedure (all within a batch executive routine) to perform some function needed in an overall batch process, as defined by the recipe for that batch process. A phase class may include zero or more phase input parameters, which are basically the inputs provided to the phase class subroutine from the batch executive routine or another phase class, zero or more phase output parameters which are basically the outputs of the phase class subroutine passed back to the batch executive routine or to another phase class, zero or more phase messages, which may be messages to be displayed to the user regarding the operation of the phase class, information related to other phase classes with which this phase class is associated in some manner, and zero or more phase algorithm parameters which cause parameters to be created in phase logic modules or unit phases based on this phase class. (Unit phases are simply the instantiated versions of the phase class for a particular unit.) These phase algorithm parameters are used as temporary storage locations or variables during the execution of the phase and are not necessarily visible to the user or to the batch executive routine. Each phase includes one or more phase algorithm definitions (PADs) which, generally speaking, are the control routines used to implement the phase. Also, each phase class has a list of associations to zero, one, two or more unit classes, and this list defines the unit classes for which this phase class and, consequently, the PAD of the phase class, can be applied. Thus, the same phase class can be associated with the same unit classes of different process cells or with different unit classes of the same or different process cells or equipment trains.

Referring again to the unit modules in FIG. 2, each unit module object includes zero or more unit tag objects (UT) or parameters having initial values. The UT objects are illustrated only for the R1 and R2 modules in FIG. 2. These parameters may correspond to settings and configuration parameters of the equipment associated with the unit module. These unit tags may define, for example, the capacity of the unit, the materials of which the unit is made, the unit manufacturer, or any other data or parameters associated with the unit. This data can be fixed, such as manufacturing data, or variable, such as the last time the unit was used, the last process or material placed in the unit, etc. Still further, each unit module object may have alarms, resource identifications, a control display (such as a human-machine interface picture), a list of the resources that this unit module requires, process cell information, etc. associated therewith.

As is known, a batch control routine or batch procedure is created to perform a particular batch process on a group or set of equipment which may include, for example, any of the reactor units (R1, R2, R3, R4), the filter units (F1, F2, F3) and the dryers (D1, D2, D3). Generally, such a batch procedure will call or implement one or more unit procedures or unit module objects, each of which may be associated with a particular unit and which may own one or more module objects, when that unit procedure needs to be executed during the overall batch procedure. However, instead of specifying the particular units to be used in each of the different unit procedures when the batch procedure is written or first started to be executed, the batch procedure may include a dynamic selection routine that selects a unit to be used for each particular unit procedure or stage of a batch procedure when that unit procedure or stage is to be performed. The timing of this selection may be long after the batch procedure is written and first started to run. In fact, in some instances, the dynamic unit selection for later stages of a batch procedure may occur hours or even days after a batch procedure is first started.

Generally speaking, a batch procedure will be written to call different unit procedures or unit modules associated with different sets (or sometimes the same set) of units or equipment. When written, the batch procedure can specify a certain or particular process cell for which it is to be run, or it can be written to allow a user or operator to select a process cell to be used at the start of the batch procedure. However, once a particular process cell is selected and the batch procedure is started, the batch procedure is limited to using equipment or unit modules associated with the selected process cell.

Of course, when creating or writing the batch procedure, an engineer may simply have the batch procedure call the dynamic unit selection routine whenever a new unit procedure is to be performed. The engineer may create a unit allocation table object for each unit procedure, unit class, unit object, etc. to be used by the selection routine to dynamically select units. This unit allocation table may, for example, include a suitability expression and a priority expression to be implemented for the associated unit procedure, unit classes, unit modules, etc. The engineer must also assure that the unit tags for each unit module includes the unit parameters needed by the selection routine. The engineer can then download the batch procedure, the selection routine, the unit allocation tables and the unit tags to the appropriate databases within the appropriate controller 12 and/or workstation 14, at which time the batch procedure can be executed.

Figure 3:
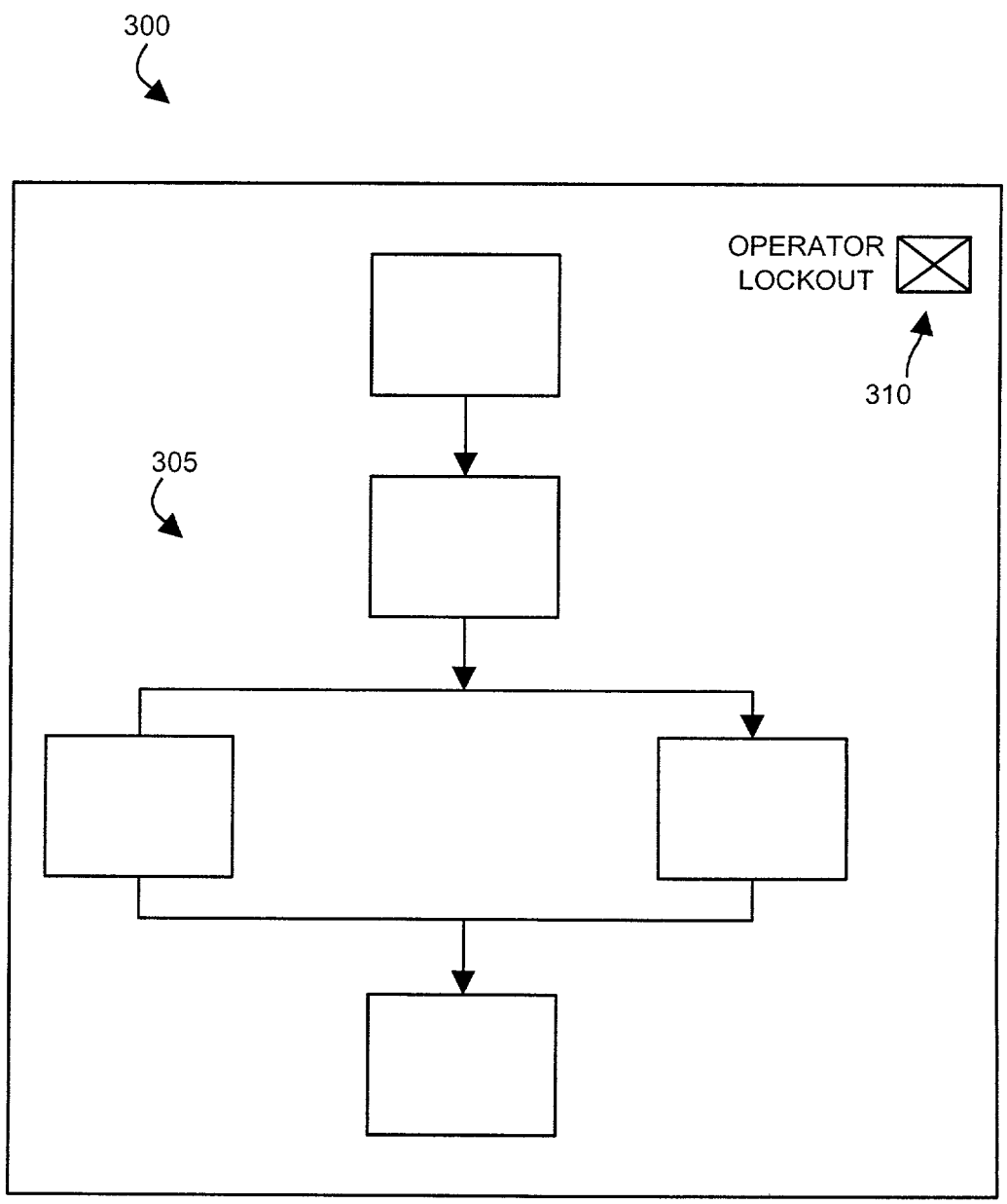
FIG. 3 illustrates a user interface that may be used to control or construct a phase using a graphical depiction of the phase.

Referring now to FIG. 3, a depiction of a user interface 300 may include a phase diagram graphical depiction 305 in flowchart form including various boxes representative of the steps of a phase. Such a user interface 300 may be similar to a user interface that may be displayed on a video display of a workstation (e.g., 14) while an operator designs or monitors a phase or batch process. The steps represented by the various boxes in the phase diagram may be carried out using various unit module objects and/or module objects.

The user interface 300 may also include an operator lockout check box 310, representative of a parameter that allows a user to enable and disable locking features of unit module objects and/or module objects when the unit module objects and/or module objects are used by the phase represented by the flow diagram 305 shown on the user interface 300. As used herein, the term "locked" means information may not be written to a unit module object or module object and "unlocked" means information may be written to a unit module object or a module object. Information to be written to module objects may include, but is not limited to, parameters such as set points, flow rates, timing or other parameters. For the purposes of this disclosure, a particular unit module object and/or a module object is referred to as owned by a particular phase when that phase uses that particular unit module object and/or module object during execution of the phase. In particular, to prevent the disruption of phase operation, access to unit module objects and/or their associated module objects may be advantageously controlled through the use of the check box 310. For example, when an operator designing or modifying a phase enables the lockout feature through the use of the check box 310, the unit module objects and/or module objects owned by a particular phase may be locked when that phase is active. A phase may have various modes of operation during which the phase may be considered active. For example, a phase may be considered active when the phase is running, holding, stopping, aborting or restarting. When a phase is idle, complete, stopped or aborted, module objects owned by its unit module objects may not be locked. Alternatively, unit object and/or module objects may be locked even when a phase is not operating.

Figure 4:
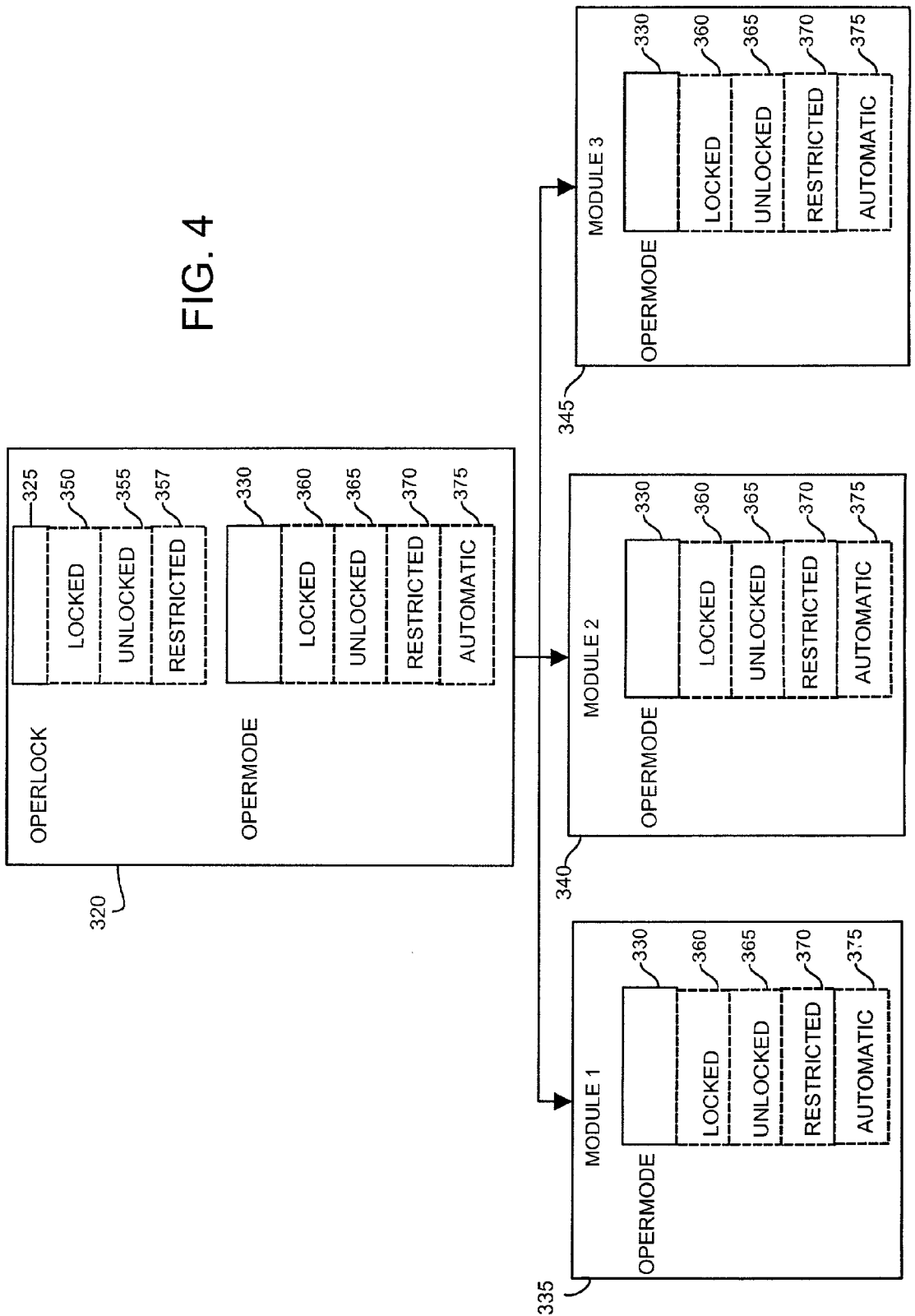
FIG. 4 illustrates a relationship between a unit module object and three exemplary module objects that are owned by the unit module object.

As shown in FIG. 4, a unit module object 320 may include an OPERLOCK attribute, parameter or field 325 and a OPERMODE attribute, parameter or field 330, each of which represent attributes that may be used to control operator access to unit module objects and/or module objects owned by unit module objects. The OPERLOCK attribute is a module-level name set parameter included in each unit module object and the OPERMODE attribute is a module-level name set parameter included in each unit module object and/or module object. The OPERMODE and OPERLOCK fields 325, 330 may have pull down menus that may be used by a user to fill the fields 325, 330 with different values. Alternatively, the OPERMODE and OPERLOCK fields 325, 330 may be operated on (i.e., locked, unlocked, etc.) by portions of software. Also shown in FIG. 4 are three module objects 335, 340, 345 that are owned by the unit module object 320. Each of the module objects 335, 340, 345 has an OPERMODE field 330. Values entered in the OPERLOCK and OPERMODE fields 325, 330 control the state of a unit module object and/or module object. For example, a unit module object or module object may be locked or unlocked based on the values entered in the OPERLOCK and OPERMODE fields 325, 330. Further detail regarding operator access and how it may be controlled using the OPERLOCK and OPERMODE fields 325, 330, will be provided with respect to FIGS. 5, 6A and 6B and their accompanying description provided below.

The OPERLOCK field 325 may have pull down menu items that may include LOCKED, UNLOCKED and RESTRICTED values 350, 355, 357, respectively, which may be selected by an operator. For example, an operator may use a mouse, a keyboard or some other input device at a workstation 14 to select a value from the pull down menus. Alternatively, the value of the OPERLOCK field 325 may calculated or evaluated based on the operator lockout check box 310 (FIG. 3) and the value of the OPERMODE field 330, which will be described in further detail below. For example, when an operator edits or creates a phase, if the operator selects the operator lockout check box 310, the OPERLOCK field 325 of the unit module object 320 may be filled in with the LOCKED value when a phase using that unit module object 320 begins. Alternatively, the OPERLOCK field 325 of the unit module object 320 may be controlled independently of whether or not a phase using the unit module object 320 is running or may track the state of the OPERMODE field 330. If the OPERMODE field 330 of the unit module object 320 and the modules 335, 340, 345 are properly set (as described in detail below), the OPERLOCK field 325 may be used to control access to the unit module 320 and the modules 335, 340, 345. Accordingly, the OPERLOCK field 325 may be advantageously used to prevent an operator from disrupting a phase by changing the software or attributes of the unit module object 320 or the module objects 335, 340, 345. The operation of the OPERLOCK field 325 and its evaluation will be described below in further detail with respect to FIG. 5.

The OPERMODE field 330, which may be included in the unit module object 320 and/or the module objects 335, 340, 345, may include pull down menus including values of LOCKED, UNLOCKED, RESTRICTED or AUTOMATIC as represented by reference numerals 360, 365, 370 and 375, respectively, in FIG. 4. If the OPERMODE field 330 has a value of LOCKED, all write attempts to that unit module object and/or a module object owned by that unit module object will be prevented. Therefore, an operator is prevented from making changes to a unit module object or module object having an OPERMODE field 330 specifying a value of LOCKED. Conversely, if the OPERMODE field 330 has a value of UNLOCKED, writes may be made to the unit module object or module object (possibly subject to a standard security check). If a unit module object or module object has an OPERMODE field 330 having a value of RESTRICTED, that unit module or module may only be changed if the operator seeking to make the changes has an appropriate authorization code. For example, an operator may need to enter a valid code, personal identification number (PIN) or password into a workstation 14 before the operator will be allowed to make changes to restricted objects or modules.

The OPERMODE field 330 of unit module objects and module objects may also have a value of AUTOMATIC. While operation of the OPERMODE field 330 having values of LOCKED, UNLOCKED and RESTRICTED may be substantially similar between the unit module object and module objects (e.g., changes may be allowed, prevented or based on restricted access), an OPERMODE field 330 value of AUTOMATIC may function slightly differently depending on whether the OPERMODE field 330 is located in a unit module object 320 or in a module object 335, 340, 345.

If the OPERMODE field 330 for the unit module object 320 has a value of AUTOMATIC, the unit module object 320 will be either locked or unlocked depending on the OPERLOCK state of the unit module object 320. Detail regarding the evaluation of the OPERLOCK state is provided below in conjunction with the description of FIG. 5. For example, if the OPERMODE field 330 of the unit module object 320 has a value of AUTOMATIC and the OPERLOCK field 325 has a value of LOCKED, the unit module object 320 will be locked and, therefore, an operator will be prevented from making changes to the unit module object 320. In instances in which the OPERMODE field 330 of the unit module object is set to AUTOMATIC, the value of the OPERLOCK field 325 may be determined based on whether a phase using the module object is operating. Conversely, if the OPERMODE field 330 has a value of AUTOMATIC and the OPERLOCK field 325 has a value of UNLOCKED, an operator will be able to make changes to the unit module object 320.

If the OPERMODE field 330 in a module object (e.g., the module object 335) has a value of AUTOMATIC, the state of the module object 335 (e.g., locked, unlocked or restricted) is determined based upon the OPERMODE field 330 value of the unit module object 320 that owns the module object 335. For example, referring to FIG. 4, if the OPERMODE field 330 of the module object 335 has a value of AUTOMATIC, the module object 335 will determine its state by evaluating the OPERLOCK field 325. Accordingly, access to module objects may be controlled hierarchically by controlling access to the unit module objects that own various module objects.

When both of the OPERMODE fields 330 of the unit module object 320 and the module object 335 have a value of AUTOMATIC, the state of the module object 335 will be controlled by the OPERLOCK field 325 of the unit module object 320. For example, if the OPERLOCK field 325 has a value of LOCKED, the module object 335 will be locked. Conversely, if the OPERLOCK field 325 of the unit module object 320 has a value of UNLOCKED, the module object 325 will be unlocked.

Because both OPERLOCK and OPERMODE are module-level parameters, multiple phases could coordinate their operation to change OPERLOCK and OPERMODE parameters of various module objects and/or unit module objects.

For example, a phase could lock a module object by writing a LOCK value to the OPERMODE of the module object at the beginning of the phase and could place the module object back into automatic mode by writing an AUTOMATIC value to the OPERMODE of the after the phase has substantially completed.

Figure 5:
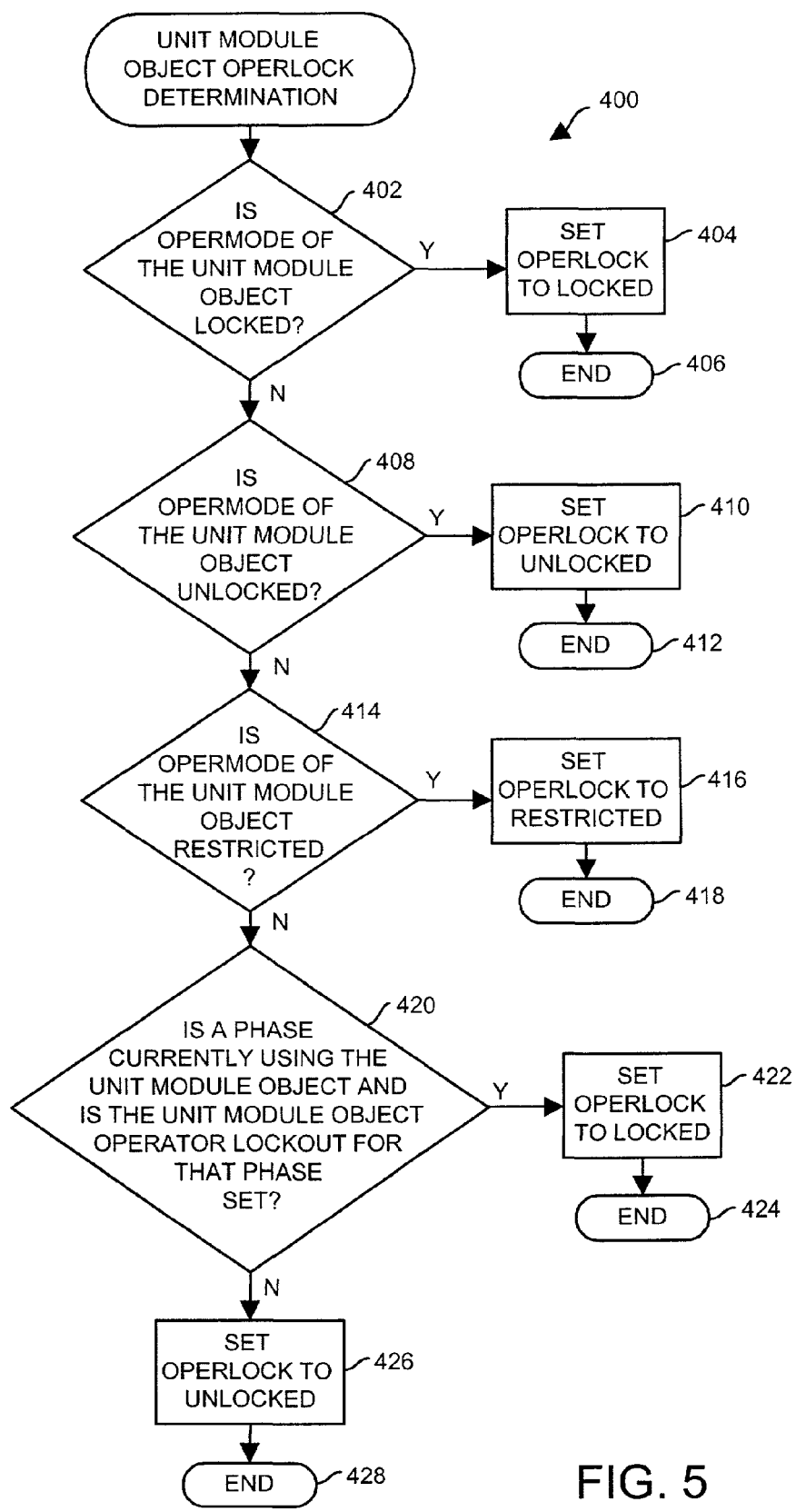
FIG. 5 illustrates a process by which a unit module determines a value for its OPERLOCK parameter.

Turning now to FIG. 5, a unit module object OPERLOCK determination function 400 includes various steps or procedures that are represented by various blocks. The steps or procedures shown in FIG. 5 may be carried out using software instructions written in a suitable language, wherein the software instructions may be executed on a processor such as may be included in the controller 12 or the workstations 14. A unit module object may periodically determine a value of its OPERLOCK attribute so that the OPERLOCK attribute of the unit module object may be read by various other portions of software including the security check process software that will be described in connection with FIGS. 6A and 6B.

Generally, for unit module object OPERMODE field values of LOCK, UNLOCK and RESTRICTED, the OPERLOCK attribute tracks the value of the OPERMODE field 330 of the unit module object 320 (FIG. 4). However, when the OPERMODE field 330 of the unit module object 320 has a value of AUTOMATIC, the value of the OPERLOCK attribute is determined based on whether the unit module object is in use by a phase and whether the operator lockout check box 310 (FIG. 3) of that phase is selected.

Referring again to FIG. 5, at a block 402, the process 400 determines if the OPERMODE attribute of the unit module object 320 has a value of LOCKED. If the OPERMODE attribute has a value of LOCKED, control passes from the block 402 to a block 404, which sets the OPERLOCK attribute of the unit module object 320 equal to LOCKED (i.e., the same value as the OPERMODE attribute) and passes control to a block 406 to end the process 400. If, however, the OPERMODE attribute does not have a value of LOCKED, the block 402 passes control a block 408.

The block 408 determines if the value of the OPERMODE attribute is set to UNLOCKED. If the block 408 determines that the OPERMODE attribute is set to UNLOCKED, control passes from the block 408 to a block 410, which sets the OPERLOCK attribute to UNLOCKED (i.e., the same state as the OPERMODE attribute). After block 410 completes its execution, the block 410 passes control to a block 412, which ends the process 400. If the block 408 determines that the OPERMODE attribute of the unit module object 320 is not set to UNLOCKED, control passes from the block 408 to a block 414.

Like blocks 402 and 408, the block 414 tests the value of the OPERMODE attribute. The block 414, however, tests to determine if the OPERMODE attribute is set to RESTRICTED. If the block 414 determines that the OPERMODE attribute is set to RESTRICTED, control passes from the block 414 to a block 416, which sets the value of the OPERLOCK attribute equal to RESTRICTED. After execution of the block 416 is complete, control passes to a block 418, which ends execution of the process 400.

If the answers to the queries set forth in blocks 402, 408 and 414 are all "no," control will eventually pass to a block 420. Because blocks 402, 408 and 414 test for the unit module object OPERMODE attribute to be equal to LOCKED, UNLOCK and RESTRICTED, respectively, if execution of the process 400 reaches block 420, the OPERMODE attribute must be equal to AUTOMATIC. The block 420 determines if a phase is currently using the unit module object 320 and, if the unit module object is currently being used, if the operator lockout check box 310 (FIG. 3) for the phase using the unit module object 320 is selected. This is possible because each module knows the identities of the unit modules that own it. If the unit module object 320 is in use and the operator lockout check box 310 of the phase using the unit module object 320 is selected, control passes to a block 422. The block 422 sets the OPERLOCK attribute equal to LOCKED and passes control to a block 424, which ends execution of the process 400.

While the process 400 shown in FIG. 5 is illustrated as having the queries shown as blocks 402, 408, 414 and 420 in a particular order, those having ordinary skill in the art will readily recognize that the ordering of the queries may be changed. For example, the query performed by the block 402 may be performed after either of the queries performed by the blocks 408 or 414. As a further example of how the queries may be rearranged in FIG. 5, consider that if the answers to the queries performed by blocks 402, 408 and 414 are all "no", the block 420 assumes that the OPERMODE is in an AUTOMATIC mode. Such an assumption may be made because the OPERMODE has been tested by blocks 402, 408 and 414 before the execution of block 420. Accordingly, instead of the last query assuming the OPERMODE is AUTOMATIC, queries may be added or reordered to allow a last query to assume that the OPERMODE is, for example, LOCKED. For example, if the block 402 of FIG. 5 was changed to test if the OPERMODE is AUTOMATIC instead of LOCKED, when execution of the process 400 reached the block 420, the block 420 could assume that the OPERMODE was LOCKED because the queries performed by the blocks 402, 408 and 414 all had an answer of "no."

Returning now to the block 420, if either the unit module object 320 is not currently being used by a phase or the operator lockout check box 310 of a phase using the unit module object 320 is not selected, control passes from the block 420 to a block 426. The block 426 sets the OPERLOCK attribute equal to UNLOCKED before passing control to a block 428, which ends the process 400.

As will be appreciated by the foregoing description of FIG. 5, when the OPERMODE attribute of the unit module object 320 is set to AUTOMATIC, the blocks 420-428 function to automatically set the OPERLOCK attribute either to LOCKED or UNLOCKED based on whether the unit module object 320 is in use by a phase and whether the operator lockout check box 310 lockout is selected. As will be described with respect to the security check process 500 shown in FIGS. 6A and 6B, the OPERLOCK attribute is useful in preventing operator access to unit module objects and/or module objects during phase operation.

Figure 6A:
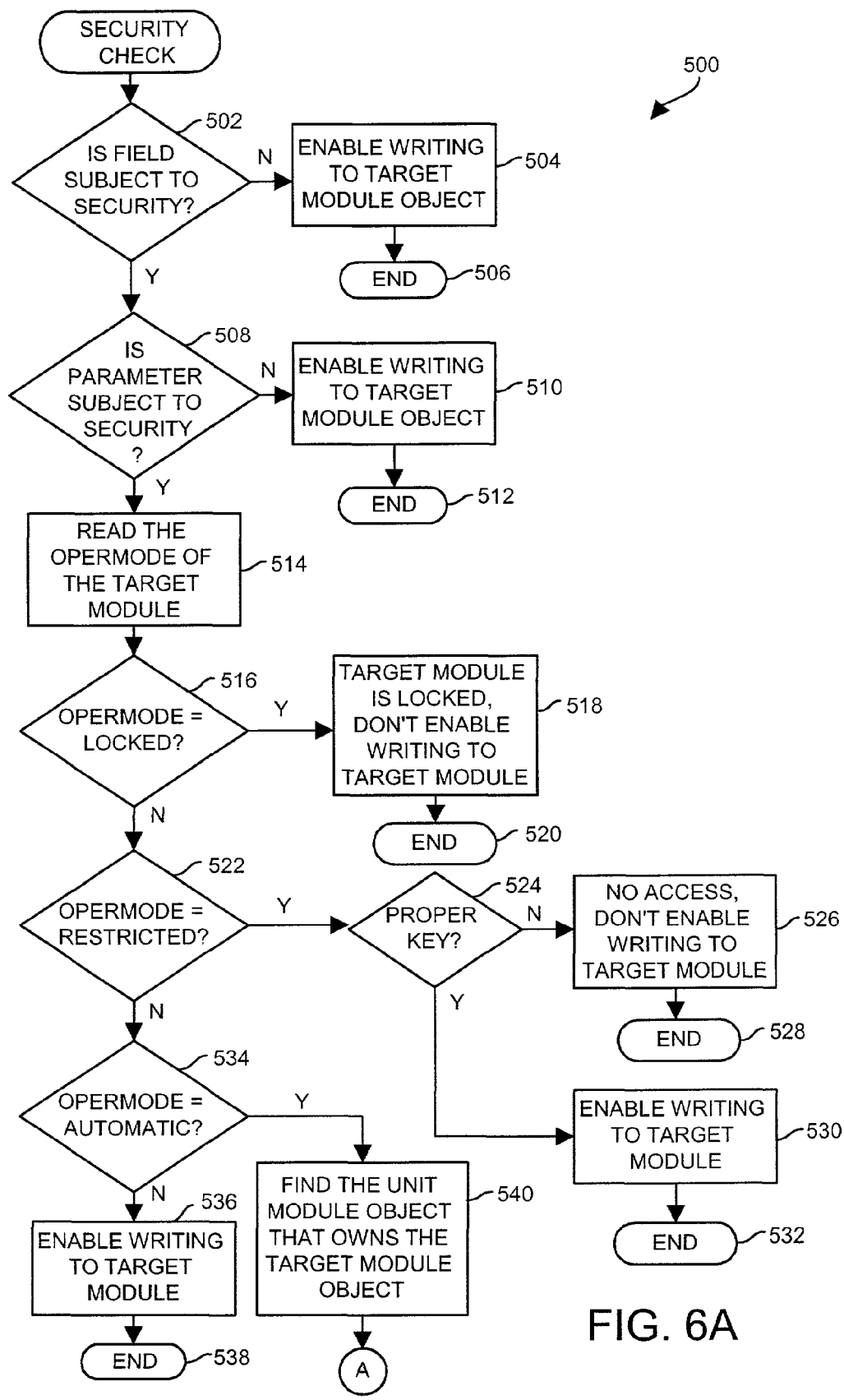
FIGS. 6A and 6B illustrate a security check process for preventing operators from making inadvertent changes to modules of a process control system.
Figure 6B:
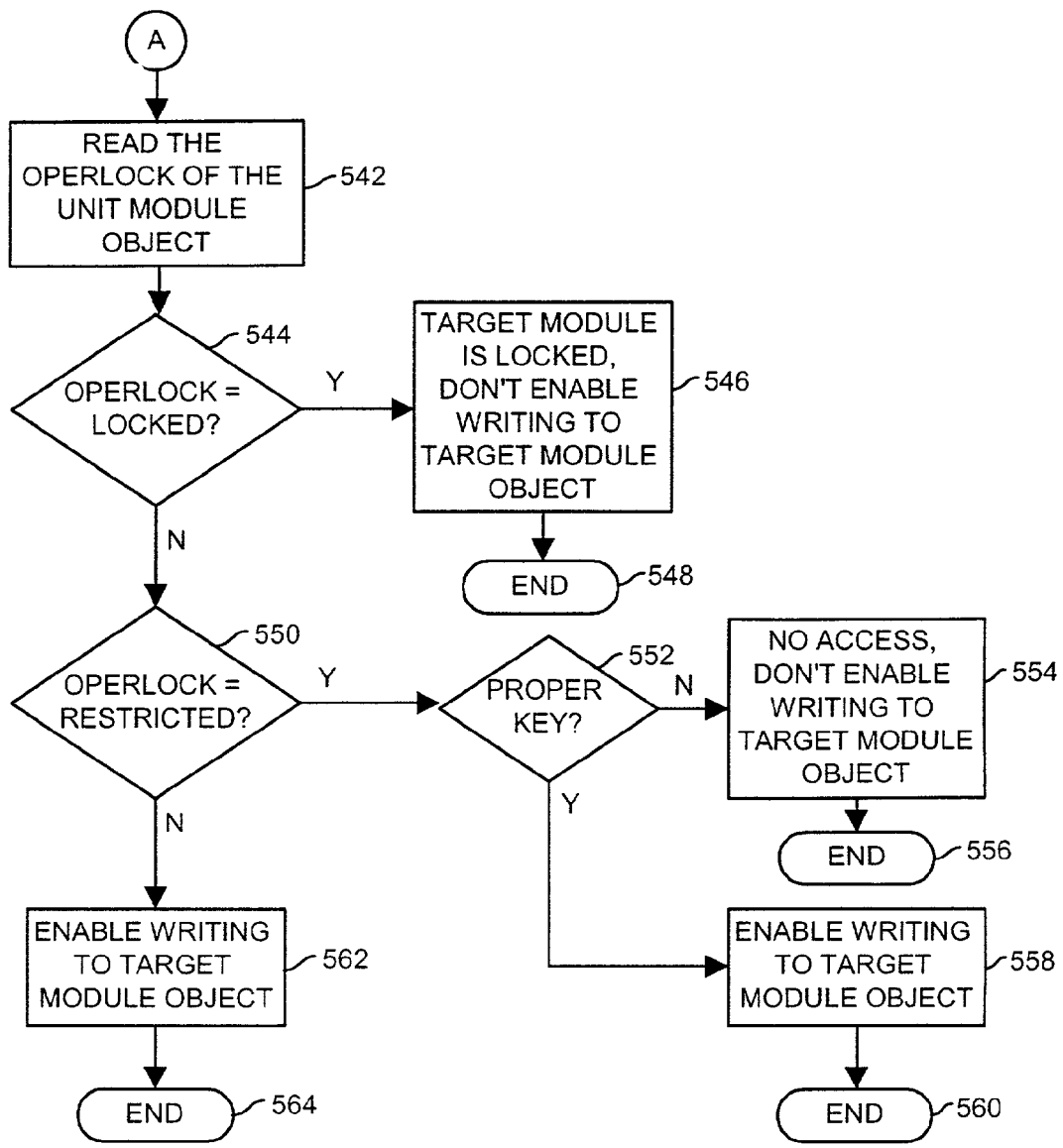

To prevent an operator from inadvertently writing information or parameters such as set points, flow rates, and the like to a unit module object and/or a module object, a security check process 500, as shown in FIGS. 6A and 6B is carried out when an operator desires to write information to a unit module object and/or a module object. Additional or other security checks may be performed in addition to the process shown in FIGS. 6A-6B. For ease of description, it will be assumed that a module object to which information is to be written is called a target module object, because it is the target of information that is to be written. Information that is to be written to a unit module object and/or a module object may have an address thereon, wherein the address may include a parameter name and a field name. A parameter name may be used to identify a data structure into which information is to be written. A field name may be used to identify a particular location within a data structure into which information is to be written. Accordingly, the field name and the parameter names may act as an address for information to be written to the target module.

As will be highlighted in the subsequent description, an operator will have the ability to write information to a target module object based on the OPERMODE attributes of the target module object and the unit module object that owns the target module object. Additionally, the ability to write information to the target module object may depend on the value of the OPERLOCK attribute of the unit module object that owns the target module object.

Returning to FIGS. 6A and 6B, when the process 500 begins, a block 502 determines if the field into which the information is to be written is subject to security conditions. If the information to be written to the target module object is not subject to security conditions, control passes to a block 504, which enables writing to the target module object. After block 504 is completed, the security check process 500 ends at block 506. If, however, the field into which the information is to be written is subject to security conditions, control passes from the block 502 to a block 508, which determines if the parameter that is to be written into the target module object is subject to security conditions. If the parameter that is to be written into the target module object is not subject to security conditions, control passes to a block 510, which enables writing to the target module object and passes control to a block 512, thereby ending the security check process 500. Whether a field or a parameter is subject to security conditions may merely be a design choice. For example, acknowledgment of alarms or other status conditions may not be subject to security conditions because an operator may always need to respond to alarms, status conditions and the like. If the information that is to be written to the target module object is a parameter subject to security conditions, block 508 passes control to a block 514 which reads the OPERMODE of the target module object.

After the OPERMODE of the target module object has been read at the block 514, control passes to a block 516. If the OPERMODE of the target module object is LOCKED, the block 516 passes control to a block 518, which disables writing to the target module object and may inform the operator that the target module object is locked. After the block 518 completes, control passes to a block 520 at which the security check 500 ends. If the OPERMODE of the target module object is not locked, the block 516 passes control to a block 522 which determines if the OPERMODE of the target module object is RESTRICTED. If the OPERMODE is RESTRICTED, control passes from the block 522 to a block 524, which determines whether the operator has a proper key to enable the operator to write information to the target module object. The proper key may consist of a personal identification number (PIN), an operator name, a password or any other suitable piece of information that may be used to identify an operator. If the operator does not have the proper key, the block 524 passes control to a block 526, which disables writing to the target module object and may inform the user that he or she does not have access to write to the target module object. After the block 526 executes, control passes to a block 528, which ends execution of the security check process 500. If, however, the operator does have an appropriate key, the block 524 passes control to a block 530 that enables information to be written to the target module object and which further passes control to a block 532, which ends the security process 500.

If the OPERMODE of the target module is not LOCKED and is not RESTRICTED, control passes from the block 522 to a block 534, which determines if the OPERMODE is AUTOMATIC. If the OPERMODE is not set to AUTOMATIC, OPERMODE must be set to UNLOCKED and the block 534 passes control to block 536, which enables information to be written to the target module. After the block 536 completes execution, control passes to a block 538, which ends the security check process 500.

If, however, the block 534 determines that the OPERMODE is set to AUTOMATIC, control passes to a block 540, which determines the unit module object that owns the target module object. For example, referring back to FIG. 4, if the OPERMODE of the module object 335 is set to AUTOMATIC, the block 540 of FIG. 6A would determine that the module object 335 is owned by the unit module object 320. This is possible because each module knows the identities of the unit modules that own it. After the unit module that owns the target module object is determined, control passes from the block 540 to a block 542, which reads the OPERLOCK of the unit module object. As described in connection with FIG. 5, OPERLOCK is an attribute that may be determined by the OPERMODE of the unit module object and/or may be based on whether a unit module object is in use by a phase and whether the operator lockout feature of the phase is enabled.

After the OPERLOCK of the unit module object is read by the block 542, a block 544 determines whether the OPERLOCK of the unit module object is set to LOCKED. If the OPERLOCK of the unit module object is set to LOCKED, control passes from the block 544 to a block 546, which disables information to be written to the target module object. After execution of the block 546 is complete, control passes to a block 548, which ends execution of the process 500.

If the OPERLOCK of the unit module object is not set to LOCKED, the block 544 passes control to a block 550, which determines if the OPERLOCK of the unit module object is set to RESTRICTED. If the OPERLOCK of the unit module object is set to RESTRICTED, control passes from the block 550 to a block 552, which selectively passes control to either a block 554 and a block 556 or to a block 558 and a block 560. Collectively, the blocks 552-560 perform the functions of determining if an operator has a proper key and/or password to enable the operator to have access to restricted module objects and enabling or disabling writing ability of the operator based on the key. Blocks 552-560 function substantially similarly to block 524-532 described hereinbefore.

If the block 550 determines that the OPERLOCK of the unit module object is not RESTRICTED, the OPERLOCK of the unit module object must be UNLOCKED and control passes to a block 562, which enables information to be written to the target module object. After the block 562 is complete, control passes to a block 564, which ends execution of the process 500.

As will be appreciated by those having ordinary skill in the art, as with FIG. 5, the blocks within the process 500 may be rearranged while maintaining the functions needed to carry out the process 500. For example, the block 508 may be carried out before the block 502. Additionally, the blocks 516, 522 and 534 may be arranged in any order or blocks 544 and 550 may be arranged in any order.

As will be appreciated by those having ordinary skill in the art, the security check 500, as shown in FIGS. 6A and 6B, allows for hierarchal locking of unit module objects and/or module objects. For example, the OPERMODE of each module object may be LOCKED, UNLOCKED or RESTRICTED, thereby allowing individual control of each module object. Alternatively, the OPERMODE of multiple module objects may be set to AUTOMATIC, whereby access to those module objects may be controlled by the OPERMODE of the unit module object that owns the those module objects. Further, the OPERMODE of the unit module object that owns unit module objects may be set to AUTOMATIC, whereby the OPERLOCK of the unit module object then controls access to the module objects owned by the unit module object having an OPERMODE that is set to AUTOMATIC. When OPERMODE is set to AUTOMATIC, OPERLOCK is controlled by phases using the module and thus, the phases may control writing to the modules owned by a unit module.

It will be understood that process control routines, such as batch procedures, using access control can be used and implemented within any desired process control programming environment, and may be used in any process control system using any desired type of process control communication protocol and, further, may be used to perform any type of function with respect to any type of device(s) or sub-units of device(s). Accordingly, the functions shown in the flowcharts described herein are not necessarily limited to being implemented as shown and, as one having ordinary skill in the art will readily appreciate, may be implemented in a variety of ways. Process control routines using access control as described herein are preferably implemented in software stored in, for example, a controller or other process control device. However, these routines may alternatively or additionally be implemented in hardware, firmware, application specific integrated circuits, programmable logic circuits, etc., as desired. If implemented in software, the process control routines may be stored in any computer readable memory such as on a magnetic disk, an optical disk, or other storage medium, in a random access memory (RAM) or a read only memory (ROM) of a computer, controller, field device, a programmed logic device, etc. Further, such software may be stored in an uncompressed state or in a compressed state, wherein such software must be installed to be operational. Likewise, this software may be delivered to a user or a device via any known or desired delivery method including, for example, over a communication channel such as a wireless link, a telephone line, the Internet, on a transportable medium, such as a computer-readable disk, etc.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of controlling access for writing information in a process control system that includes a unit module object associated with a hardware component having a plurality of hardware subunits and that includes a plurality of module objects associated with the unit module object, each of the plurality of module objects being associated with a different one of the plurality of hardware subunits, comprising:

storing, in the unit module object, parameters for controlling the hardware component, the unit module object including a unit module object security attribute having a value;

storing, in a particular one of the module objects, parameters for controlling a particular one of the subunits of the hardware component, wherein the particular one of the module objects has a module object mode attribute, wherein the particular one of the module objects is used to change an operating state of the particular one of subunits of the hardware component and wherein the module object mode attribute can be set to any one of a first set of values, each of the first set of values being independent of the unit module object security attribute value or that can be set to a further value that indicates a dependence on the unit module object security attribute value; and determining whether to allow a write to the module object based on the value of the module object mode attribute by selectively allowing access for writing information to the module object as indicated by the one of the first set of values of the module object mode attribute when the module object mode attribute is set to one of the first set of values and by selectively allowing access for writing information to the module object as indicated by the value of the unit module object security attribute when the module object mode attribute is set to the further value.

2. The method of claim 1, wherein selectively allowing access for writing information to the module object includes allowing access for writing information to the module object when the module object mode attribute is set to the further value and the value of the unit module object security attribute indicates an unlocked state.

3. The method of claim 1, wherein selectively allowing access for writing information to the module object includes not allowing access for writing information to the module object when the module object mode attribute is set to the further value and the value of the unit module object security attribute indicates a locked state.

4. The method of claim 1, wherein selectively allowing access for writing information to the module object includes determining whether a user has authorization to write information to the module object.

5. The method of claim 1, wherein the unit module object security attribute is a unit module object lock attribute having a value and wherein selectively allowing access for writing information to the module object when the module object mode attribute is set to the further value includes controlling access for writing information to the module object based on the value of the unit module object lock attribute.

6. The method of claim 5, wherein the process control system includes a phase and wherein selectively allowing access for writing information to the module object when the module object mode attribute is set to the further value includes determining the value of the unit module object lock attribute by determining if the unit module object is being used by the phase.

7. The method of claim 5, wherein the process control system includes a phase including an operator lockout field and wherein selectively allowing access for writing information to the module object when the module object mode attribute is set to the further value includes determining the value of the unit module object lock attribute by determining if the operator lockout field has been set for the phase using the unit module object.

8. The method of claim 1, wherein the unit module object security attribute includes a unit module object lock attribute having a value and wherein selectively allowing access for writing information to the module object includes controlling access for writing information to the plurality of module objects based on the value of the unit module object lock attribute.

9. The method of claim 8, wherein selectively allowing access for writing information to the plurality of module objects includes not allowing access for writing information to the plurality of module objects when the value of the unit module lock attribute indicates a locked state.

10. The method of claim 8, wherein selectively allowing access for writing information to the plurality of module objects includes allowing access for writing information to the plurality of module objects when the value of the unit module lock attribute indicates an unlocked state.

11. The method of claim 1, wherein selectively allowing access for writing information includes controlling access for writing information to the plurality of module objects based on the value of the unit module object security attribute.

12. The method of claim 11, wherein selectively allowing access for writing information includes not allowing access for writing information to the plurality of module objects when the value of the unit module security attribute indicates a locked state.

13. The method of claim 11, wherein selectively allowing access for writing information includes allowing access for writing information to the plurality of module objects when the value of the unit module security attribute indicates an unlocked state.

14. An access control system for controlling access for writing control parameters to control elements in a process control system that includes a unit module object associated with a hardware component having a plurality of hardware subunits and that includes a plurality of module objects associated with the unit module object, each of the plurality of module objects being associated with a different one of the plurality of hardware subunits, comprising:
 a processor;
 a unit module object that stores parameters for controlling the hardware component and including a unit module object security attribute having a value;
 a first module object that stores parameters for controlling a particular one of the subunits of the hardware component, wherein the first module object is used to change an operating state of the particular one of the subunits of the hardware component and includes a module object mode attribute, the module object mode attribute being settable to any one of a first set of values, each of the first set of values being independent of the unit module object security attribute value or settable to a further value that indicates a dependence on the unit module object security attribute value;
 a memory;
 a first routine stored on the memory for causing the processor to determine the value of the module mode attribute; and
 a second routine stored on the memory for causing the processor to selectively allow access for writing information to the first module object based on the value of the module object mode attribute by selectively allowing access for writing information to the module object as indicated by the one of the first set of values of the module object mode attribute when the module object mode attribute is set to one of the first set of values and by selectively allowing access for writing information to the module object as indicated by the value of the unit module object security attribute when the module object mode attribute is set to the further value.

15. The system of claim 14, wherein the second routine includes instructions for causing the processor to allow access for writing information to the first module object when the value of the unit module object security attribute indicates an unlocked state and the module object mode attribute is set to the further value.

16. The system of claim 14, wherein the second routine includes instructions for causing the processor not to allow access for writing information to the first module object when the value of the unit module object security attribute indicates a locked state and the module object mode attribute is set to the further value.

17. The system of claim 14, wherein the unit module object security attribute is a unit module object lock attribute having a value and wherein the second routine includes instructions for causing the processor to control access for writing information to the first module object based on the value of the unit module object lock attribute when the module object mode attribute is set to the further value.

18. The system of claim 17, wherein the process control system includes a phase and wherein the second routine includes instructions for causing the processor to determine the value of the unit module object lock attribute by determining if the unit module object is being used by the phase.

19. The system of claim 17, wherein the process control system includes a phase including an operator lockout and wherein the second routine includes instructions for causing the processor to determine the value of the unit module object lock attribute by determining if the operator lockout has been set for the phase using the unit module object.

20. The system of claim 14, wherein the unit module object security attribute includes a unit module object lock attribute having a value and wherein the second routine includes instructions for causing the processor to control access for writing information to the plurality of module objects based on the value of the unit module object lock attribute.

21. The system of claim 20, wherein the second routine includes instructions for causing the processor not to allow access for writing information to the plurality of module objects when the value of the unit module object lock attribute is in a locked state.

22. The system of claim 20, wherein the second routine includes instructions for causing the processor to allow access for writing information to the plurality of module objects when the value of the unit module object lock attribute is in an unlocked state.

23. A method of controlling access for writing information in a process control system comprising:
 storing, in a unit module object, parameters for controlling a hardware component that includes a plurality of hardware subunits, the unit module object including a module object corresponding to at least one of the plurality of hardware subunits and including a unit module object mode attribute having a value and a unit module object lock attribute having a value;
 storing, in the at least one of the module objects of the unit module object, parameters for controlling a particular one of the subunits of the hardware component, wherein the at least one of the module objects is used to change an operating state of the particular one of the subunits of the hardware component, wherein the at least one of the module objects has a module object mode attribute that (1) can be set to any one of a first set of values that are each independent of the unit module object mode attribute value or (2) that can be set to a further value that indicates a dependence on the unit module object mode attribute value or the unit module object lock attribute value;
 determining the value of the module object mode attribute; and
 selectively allowing access for writing information to the module object based on the value of the module object mode attribute when the module object mode attribute is set to one of the first set of values and based on the unit module object mode attribute value or the unit module object lock attribute value when the module object mode attribute value is set to the further value.

24. The method of claim 23, wherein selectively allowing access for writing information to the module object includes allowing access for writing information to the module object when the value of the module object mode attribute is one of the set of first values indicating an unlocked state.

25. The method of claim 23, wherein selectively allowing access for writing information to the module object includes not allowing access for writing information to the module object when the value of the module object mode attribute is one of the first set of values indicating a locked state.

26. The method of claim 23, wherein the process control system includes a phase and including determining the value of the unit module object lock attribute or the value of the unit module object mode attribute by determining whether the unit module object is in use by the phase.

27. The method of claim 26, wherein determining the value of the unit module object lock attribute or the value of the unit module object mode attribute includes determining if an operator lockout has been set for the phase using the unit module object.

28. A process control system comprising:
a hardware component that includes a first process control equipment and a second process control equipment;
a first module object associated with the first process control equipment and a second module object associated with the second process control equipment, and wherein each of the first and the second module objects includes a parameter used to control the operation of the first or second process control equipment; and
a unit module object for storing parameters for controlling the hardware component, the unit module object including the first and second module objects, wherein each of the first and second module objects includes a module object mode attribute for selectively allowing access for writing information to the parameter of the first or second module object, wherein the module object mode attribute of at least one of the first and second module objects (1) is settable to any one of a first set of values, each of the first set of values being independent of the unit module object or (2) is settable to a further value that indicates a dependence on the unit module object.

29. The process control system of claim 28, wherein the unit module object includes a unit module mode attribute for selectively allowing access for writing information to the parameters of the first or second module object when the first or second module object mode attribute is set to the further value.

30. The process control system of claim 29, wherein the module object mode attribute of at least one of the first and second module objects is based on the unit module object mode attribute, and wherein the unit module object further includes a unit module lock attribute for selectively allowing access for writing information to the parameter of the at least one of the first and second module objects.

31. The process control system of claim 30, wherein the at least one of the first and second module objects selectively allows access for writing information to the parameter of the at least one of the first and second module objects based on whether the unit module object lock attribute is set to lock.

32. The process control system of claim 31, further comprising a plurality of module objects associated with the unit module object, each of the plurality of module objects including a set of parameters to which access is controlled by the unit module lock attribute.

33. The process control system of claim 29, further comprising a plurality of module objects associated with the unit module object, each of the plurality of module objects including a set of parameters to which access is controlled by the unit module mode attribute.

34. A method of controlling access for writing information to program objects for use in controlling equipment in a process control system comprising:
executing a first module object adapted to receive an input and to adjust a state of an equipment subunit based on the received input, the first module object operating in a mode indicated by a module object mode attribute of the first module object;
executing a unit module object that references a set of module objects including the first module object to control a process equipment unit, the unit module object operating in a mode indicated by a unit module object mode attribute of the unit module object, wherein the module object mode attribute of the first module object is settable to any one of a first set of values, each of the first set of values being independent of the unit module object mode attribute or to a further value that is based on the unit module object mode attribute; and
selectively allowing access for writing information to the module object based on the value of the unit module object mode attribute when the module object mode attribute is set to the further value.

35. An access control system for controlling access for writing information to program objects for use in controlling equipment in a process control system comprising:
a processor;
a memory;
a first module object stored in the memory and adapted to receive an input and to adjust a state of an equipment subunit based on the received input, the first module object operating in a mode indicated by a module object mode attribute of the first module object;
a unit module object stored in the memory and adapted to reference a set of module objects including the first module object to control a process equipment unit, the unit module object operating in a mode indicated by a unit module object mode attribute of the unit module object, wherein the module object mode attribute is settable (1) to any one of a first set of values, each of the first set of values being independent of the unit module object mode attribute or (2) to a further value that is based on the unit module object mode attribute;
a first routine stored on the memory for causing the processor to determine the value of the module object mode attribute; and
a second routine stored on the memory for causing the processor to selectively allow access for writing information to the module object based on the value of the module object mode attribute when the module object mode attribute is set to one of the first set of values and based on the value of the unit module object mode attribute when the module object mode attribute is set to the further value.

36. A method of controlling access for writing information to program objects for use in controlling equipment in a process control system comprising:
executing a first module object adapted to receive an input and to adjust a state of an equipment subunit based on the received input, the first module object operating in a mode indicated by a module object mode attribute of the first module object;
executing a unit module object that references a set of module objects including the first module object to control a process equipment unit, the unit module object operating in a mode indicated by a unit module object mode attribute and having a unit module object lock attribute containing a value, wherein the module object mode attribute is settable (1) to any one of a first set of values, each of the first set of values being independent of the unit module object mode attribute or (2) to a further value that is based on the unit module object mode attribute and wherein the unit module object lock attribute and the module object mode attribute are based on the unit module object mode attribute when the module object mode attribute is set to the further value; and selectively allowing access for writing information to the module object based on the value of the module object mode attribute.

* * * * *